(12) United States Patent
Ogauchi et al.

(10) Patent No.: US 9,933,044 B2
(45) Date of Patent: Apr. 3, 2018

(54) AUTOMATIC TRANSMISSION

(71) Applicant: MAZDA MOTOR CORPORATION, Hiroshima (JP)

(72) Inventors: Yasuhiro Ogauchi, Higashihiroshima (JP); Shinya Kamada, Kure (JP); Tatsuhiko Iwasaki, Hiroshima (JP); Masaru Nakagishi, Hiroshima (JP)

(73) Assignee: MAZDA MOTOR CORPORATION, Hirsoshima (JP)

( * ) Notice: Subject to any disclaimer, the term of this patent is extended or adjusted under 35 U.S.C. 154(b) by 165 days.

(21) Appl. No.: 15/033,992

(22) PCT Filed: Dec. 3, 2014

(86) PCT No.: PCT/JP2014/006044
§ 371 (c)(1),
(2) Date: May 3, 2016

(87) PCT Pub. No.: WO2015/087514
PCT Pub. Date: Jun. 18, 2015

(65) Prior Publication Data
US 2016/0369872 A1    Dec. 22, 2016

(30) Foreign Application Priority Data

Dec. 13, 2013  (JP) .................................. 2013-257566

(51) Int. Cl.
*F16H 3/66*    (2006.01)

(52) U.S. Cl.
CPC .............. *F16H 3/66* (2013.01); *F16H 3/666* (2013.01); *F16H 2200/006* (2013.01); *F16H 2200/2012* (2013.01); *F16H 2200/2043* (2013.01)

(58) Field of Classification Search
None
See application file for complete search history.

(56) References Cited

U.S. PATENT DOCUMENTS

| | | |
|---|---|---|
| 3,956,946 A | 5/1976 | Murakami et al. |
| 7,892,137 B2 | 2/2011 | Kamm et al. |

(Continued)

FOREIGN PATENT DOCUMENTS

| | | |
|---|---|---|
| CN | 102466004 A | 5/2012 |
| DE | 102010039264 A1 | 2/2012 |
| JP | S55-0033501 B2 | 9/1980 |

OTHER PUBLICATIONS

International Search Report and Written Opinion issued in Application No. PCT/JP2014/006044, dated Feb. 10, 2015.

*Primary Examiner* — Colby M Hansen
(74) *Attorney, Agent, or Firm* — Studebaker & Brackett PC (57) ABSTRACT

Disclosed herein is an automatic transmission (1) including first and second planetary gear sets (PL1) and (PL2). The first planetary gear set (PL1) has a first sun gear (S1) to which power from a power source (4) is input via an input shaft (3), and a first ring gear (R1) engaged with a first brake (B1). The second planetary gear set (PL2) has a second ring gear (R2) always engaged with a first carrier (C1), a second sun gear (S2) engaged with a second brake (B2), and a second carrier (C2) engaged with an output (output gear (7)). The automatic transmission is configured to engage the first and second brakes in a first gear to allow the power from the power source to be transmitted to the output via the input shaft and the first and second planetary gear sets.

4 Claims, 3 Drawing Sheets (56) References Cited

U.S. PATENT DOCUMENTS

| | | | |
|---|---|---|---|
| 8,992,371 B1* | 3/2015 | Shim | F16H 3/66 |
| | | | 475/271 |
| 2005/0026738 A1 | 2/2005 | Diosi et al. | |
| 2008/0015081 A1 | 1/2008 | Kamm et al. | |
| 2009/0036256 A1* | 2/2009 | Hukill | F16H 3/666 |
| | | | 475/276 |
| 2012/0108382 A1 | 5/2012 | Saitoh et al. | |
| 2013/0090206 A1* | 4/2013 | Mellet | F16H 3/66 |
| | | | 475/275 |
| 2016/0290443 A1* | 10/2016 | Kutsubo | F16H 3/663 |

* cited by examiner

|  | CL1 | CL2 | CL3 | B1 | B2 | GEAR RATIO | GEAR STEP |
|---|---|---|---|---|---|---|---|
| REVERSE GEAR | ○ |  |  | ○ | ○ |  |  |
| FIRST GEAR |  | ○ |  | ○ | ○ | 4.798 | ⎫ 1.556 |
| SECOND GEAR |  |  | ○ | ○ | ○ | 3.084 | ⎫ 1.506 |
| THIRD GEAR |  | ○ | ○ | ○ |  | 2.047 | ⎫ 1.239 |
| FOURTH GEAR | ○ |  | ○ | ○ |  | 1.653 | ⎫ 1.256 |
| FIFTH GEAR | ○ | ○ |  | ○ |  | 1.315 | ⎫ 1.315 |
| SIXTH GEAR | ○ | ○ | ○ |  |  | 1.000 | ⎫ 1.247 |
| SEVENTH GEAR | ○ | ○ |  |  | ○ | 0.802 | ⎫ 1.248 |
| EIGHTH GEAR | ○ |  | ○ |  | ○ | 0.643 |  |

AUTOMATIC TRANSMISSION

TECHNICAL FIELD

The present invention relates to a technical field of an automatic transmission.

BACKGROUND ART

In recent years, in the field of automatic transmissions, efforts have been made to increase the number of gears in order to improve the fuel efficiency. For example, Patent Document 1 discloses an automatic transmission including four planetary gear sets, namely, first to fourth planetary gear sets RS1-RS4, and five frictional engagement elements, namely, brakes A and B, and clutches C, D, and E, to provide eight forward gears and one reverse gear. In this automatic transmission, the brakes A and B, and the clutch C are engaged in a first gear. This allows power from a power source to be input to a sun gear of the third planetary gear set PS3 via an input shaft. Since a ring gear of the third planetary gear set RS3 is fixed, the power is transmitted to a carrier of the third planetary gear set RS3, and is output from this carrier to an output engaged with this carrier.

CITATION LIST

Patent Document

Patent Document 1: U.S. Pat. No. 7,892,137

SUMMARY OF THE INVENTION

Technical Problem

Such multiple gears need more planetary gear sets and more frictional engagement elements, which may lead to an unwanted increase in the size of the automatic transmission not only in an input shaft direction but also in a radial direction.

Therefore, there is an attempt to reduce the overall size of the automatic transmission by reducing the sizes of respective components (in particular, the sizes of gears constituting each planetary gear set) of the automatic transmission.

However, the decrease in the sizes of gears constituting each planetary gear set may cause a decrease in the reliability of the automatic transmission, in particular, in the first gear that achieves a high gear ratio (reduction gear ratio). In particular, as in Patent Document 1, if, in the first gear, one planetary gear set decelerates the output of the automatic transmission with respect to the input, an excessive load is applied to the respective gears constituting this planetary gear set (in particular, a pinion gear with a small diameter provided in the carrier), which is a problem.

Thus, to deal with such a problem, there is an attempt to reduce the load applied to the respective gears constituting each planetary gear set by achieving, using two planetary gear sets, a reduction gear ratio necessary in the first gear.

However, if, in the first gear, two planetary gear sets are used to decelerate the automatic transmission with respect to the input, it is not easy to determine how to engage respective elements together, such as engaging the two planetary gear sets together and engaging each planetary gear set and the brake together. Thus, the overall size of the automatic transmission could not be reduced depending on how to engage those elements together, even if the sizes of gears constituting planetary gear sets were reduced.

In view of the foregoing background, it is therefore an object of the present invention to provide a technique for reducing the sizes of gears constituting planetary gear sets of an automatic transmission by performing deceleration in the first gear using two planetary gear sets, and eventually reducing the overall size of the automatic transmission by lowering the degree of complexity of engagement among the two planetary gear sets, brakes, and other elements.

Solution to the Problem

In order to achieve this object, the present invention provides an automatic transmission. The automatic transmission includes: an input shaft to which power generated by a power source is input; first and second planetary gear sets of a single pinion type; frictional engagement elements including first and second brakes; and an output. The first planetary gear set has: a first sun gear to which the power from the power source is input via the input shaft; a first ring gear engaged with the first brake; and a first carrier. The second planetary gear set has: a second ring gear always engaged with the first carrier; a second sun gear engaged with the second brake; and a second carrier engaged with the output. The automatic transmission is configured to engage the first and second brakes in a first gear to allow the power from the power source to be transmitted to the output via the input shaft and the first and second planetary gear sets.

According to the above configuration, in a first gear, power from a power source is input to a first sun gear of a first planetary gear set. The power is output from a first carrier to be input to a second ring gear of a second planetary gear set since a first ring gear is fixed. The power that has been input to the second ring gear is output from a second carrier to be transmitted to an output since the second sun gear is fixed. Accordingly, in the first gear, the first and second planetary gear sets decelerate the automatic transmission with respect to the input. This may reduce the load applied to the gears (in particular, pinion gears) constituting the first and second planetary gear sets more significantly than a case where one planetary gear set decelerates the automatic transmission with respect to the input. As a result, the gears constituting each of the first and second planetary gear sets may be reduced in size. Also, if another planetary gear set is provided, this planetary gear set is not configured to transmit power in the first gear. Thus, gears constituting this planetary gear set may also be reduced in size.

Also, the first sun gear of the first planetary gear set is disposed at a radially inner position in the first planetary gear set (closer to the input shaft). This allows the input shaft to be engaged easily with the first sun gear (either directly or via a clutch). The first and second brakes are usually disposed near a transmission case, and the first ring gear of the first planetary gear set is disposed at a radially outer position in the first planetary gear set (closer to the transmission case). Thus, this allows the first ring gear to be engaged with the first brake easily. The second sun gear of the second planetary gear set is not disposed closer to the second brake (closer to the transmission case) in the radial direction of the second planetary gear set. However, the second sun gear may be easily engaged with the second brake by allowing an endmost one of a plurality of planetary gear sets arranged side by side in the input shaft direction to function as the second planetary gear set. Furthermore, an engaging element engaging the first carrier with the second ring gear is disposed to pass through a space between the first and second brakes in the input shaft direction near the transmission case. This allows the first carrier to be engaged with the second ring gear easily. Consequently, this may reduce the overall size of the automatic transmission without increasing the degree of complexity of engagement among the first and second planetary gear sets and the first and second brakes.

The automatic transmission may further include: a third planetary gear set of a double pinion type having a third sun gear, a third carrier, and a third ring gear; and a fourth planetary gear set of a single pinion type having a fourth sun gear, a fourth carrier, and a fourth ring gear. The input shaft and the fourth carrier may be always engaged with each other. The first sun gear and the third carrier may be always engaged with each other. The third sun gear and the fourth ring gear may be always engaged with each other. The second sun gear and the fourth sun gear may be always engaged with each other. The frictional engagement elements may further include: a first clutch engaging and disengaging the second carrier with and from the third ring gear; a second clutch engaging and disengaging the input shaft with and from the first sun gear and the third carrier; and a third clutch engaging and disengaging the third sun gear with and from the third ring gear, or the third carrier with and from the third ring gear, or the third sun gear with and from the third carrier.

This may easily provide eight forward gears and one reverse gear. Furthermore, appropriately setting the number of teeth of the gears constituting the planetary gear sets may provide appropriate gear reduction ratios in the respective gears.

If the automatic transmission includes four planetary gear sets and five frictional engagement elements as described above, the automatic transmission may provide eight forward gears and one reverse gear. The first clutch and the first and second brakes may be engaged to provide the reverse gear. The second clutch and the first and second brakes may be engaged to provide the first gear. The third clutch and the first and second brakes may be engaged to provide a second gear. The second and third clutches and the first brake may be engaged to provide a third gear. The first and third clutches and the first brake may be engaged to provide a fourth gear. The first and second clutches and the first brake may be engaged to provide a fifth gear. The first, second, and third clutches may be engaged to provide a sixth gear. The first and second clutches and the second brake may be engaged to provide a seventh gear. The first and third clutches and the second brake may be engaged to provide an eighth gear.

As can be seen, appropriate engagement of the frictional engagement elements may reliably provide eight forward gears and one reverse gear. Also, in each gear, the number of disengaged ones of the five frictional engagement elements, in which the rotational resistance is higher than that in engaged ones of the frictional engagement elements, is set to be smaller than the number of engaged ones of the five frictional engagement elements. This enables efficient transmission of the power.

Advantages of the Invention

As can be seen, in an automatic transmission according to the present invention, a first planetary gear set has a first sun gear to which power from a power source is input via an input shaft, a first ring gear engaged with a first brake, and a first carrier, and a second planetary gear set has a second ring gear always engaged with the first carrier, a second sun gear engaged with the second brake, and a second carrier engaged with an output. In a first gear, the first and second brakes are engaged to allow the power from the power source to be transmitted to the output via the input shaft and the first and second planetary gear sets. This may reduce the sizes of gears constituting each of the planetary gear sets of the automatic transmission. On top of that, the overall size of the automatic transmission may also be reduced by lowering the degree of complexity of engagement among the two planetary gear sets, the two brakes, and other elements.

DESCRIPTION OF EMBODIMENTS

Embodiments of the present invention will now be described in detail with reference to the drawings.

First Embodiment

Figure 1:
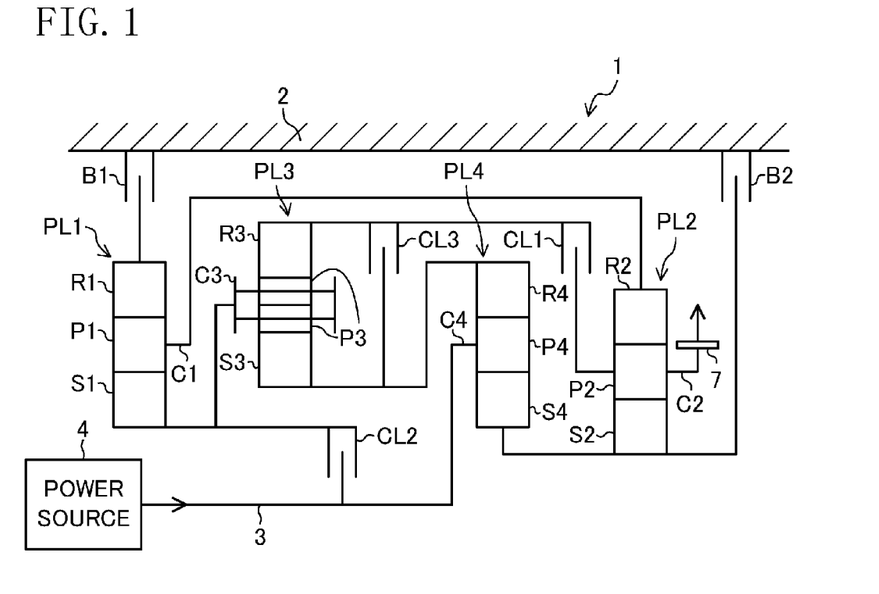
FIG. 1 is a skeleton diagram illustrating an automatic transmission according to a first embodiment of the present invention.

FIG. 1 is a skeleton diagram of an automatic transmission 1 according to a first embodiment of the present invention. This automatic transmission 1 is mounted in a vehicle, and provides eight forward gears and one reverse gear.

The automatic transmission 1 includes, in a transmission case 2, an input shaft 3, a first planetary gear set PL1, a second planetary gear set PL2, a third planetary gear set PL3, a fourth planetary gear set PL4, an output gear 7, and five frictional engagement elements CL1, CL2, CL3, B1, and B2. The input shaft 3 is coupled to a power source 4 (specifically, an output shaft of the power source 4). The output gear 7 is an output to which power from the power source 4 is transmitted through power transmission paths formed by the first to fourth planetary gear sets PL1, PL2, PL3, and PL4. The frictional engagement elements CL1, CL2, CL3, B1, and B2 change the power transmission paths.

One axial end of the input shaft 3 (i.e., the left end of FIG. 1) is coupled to the power source 4. Alternatively, the other axial end of the input shaft 3 (i.e., the right end of FIG. 1) may be coupled to the power source 4. Still alternatively, two power sources 4 may be provided, and each power source 4 may be coupled to an associated end of the input shaft 3.

The power source 4 may be an internal combustion engine or an electric motor. The input shaft 3 may be directly coupled to the power source 4, or indirectly coupled thereto via a torque converter or an engaging and disengaging clutch, for example. If two power sources 4 are respectively coupled to two ends of the input shaft 3, one of the two power sources 4 coupled to one end of the input shaft 3 may be an internal combustion engine, and the other power source 4 coupled to the other end of the input shaft 3 may be an electric motor, for example.

In this embodiment, the vehicle is an FF vehicle. The power source 4 and the automatic transmission 1 are mounted at the front of the vehicle. In this state, the output shaft of the power source 4 and the input shaft 3 of the automatic transmission 1 extend horizontally along the width of the vehicle.

The first planetary gear set PL1 is arranged coaxially with the input shaft 3, and includes a first sun gear S1, a first carrier C1, and a first ring gear R1. The first carrier C1 has a single pinion P1. That is, the first planetary gear set PL1 is of a single pinion type.

The second planetary gear set PL2 is arranged coaxially with the input shaft 3, and includes a second sun gear S2, a second carrier C2, and a second ring gear R2. The second carrier C2 has a single pinion P2. That is, the second planetary gear set PL2 is also of a single pinion type.

The third planetary gear set PL3 is arranged coaxially with the input shaft 3, and includes a third sun gear S3, a third carrier C3, and a third ring gear R3. The third carrier C3 has a double pinion P3. That is, the third planetary gear set PL3 is of a double pinion type.

The fourth planetary gear set PL4 is arranged coaxially with the input shaft 3, and includes a fourth sun gear S4, a fourth carrier C4, and a fourth ring gear R4. The fourth carrier C4 has a single pinion P4. That is, the fourth planetary gear set PL4 is of a single pinion type.

Along the input shaft 3, the first planetary gear set PL1, the third planetary gear set PL3, the fourth planetary gear set PL4, and the second planetary gear set PL2 are arranged in this order from the one end (closer to the power source 4) of the input shaft 3 toward the other end thereof.

The fourth carrier C4 is always engaged with the input shaft 3. The first carrier C1 and the second ring gear R2 are always engaged with each other. The first sun gear S1 and the third carrier C3 are always engaged with each other. The third ring gear S3 and the fourth ring gear R4 are always engaged with each other. The second sun gear S2 and the fourth sun gear S4 are always engaged with each other.

The five frictional engagement elements are comprised of a first clutch CL1, a second clutch CL2, a third clutch CL3, a first brake B1, and a second brake B2, and are arranged coaxially with the input shaft 3. The first, second, and third clutches CL1, CL2, and CL3 are configured as multi-plate clutches. The first and second brakes B1 and B2 are configured as, in this embodiment, brakes of a multi-plate clutch type, but may also be of a band type.

The first clutch CL1 engages and disengages the second carrier C2 with and from the third ring gear R3. The second clutch CL2 engages and disengages the input shaft 3 with and from the first sun gear S1 and the third carrier C3. The third clutch CL3 engages and disengages the third sun gear S3 with and from the third ring gear R3.

As described above, the second clutch CL2 engages and disengages the input shaft 3 with and from the first sun gear S1. Thus, when the second clutch CL2 is engaged, the power from the power source 4 is input to the first sun gear S1 via the input shaft 3 (and is also input to the third and fourth carriers C3 and C4 at the same time).

The first brake B1 engages and disengages the first ring gear R1 with and from the transmission case 2. The second brake B2 engages and disengages the second sun gear S2 with and from the transmission case 2. That is to say, the first ring gear R1 is engaged with the first brake B1, and is fixed to the transmission case 2 by the engagement of the first brake B1. Also, the second sun gear S2 is engaged with the second brake B2, and is fixed to the transmission case 2 by the engagement of the second brake B2.

The output gear 7 is arranged coaxially with the input shaft 3. The output gear 7 is always engaged with the second carrier C2, and is driven by the second carrier C2. Although not illustrated, the output gear 7 meshes with a counter input gear which is a counter input of a counter mechanism and drives the counter input gear. This counter mechanism includes a counter shaft, the counter input gear, and a counter output gear. The counter shaft is disposed so as to extend parallel to the input shaft 3. The counter input gear is arranged on the counter shaft and is driven by the output gear 7. The counter output gear is a counter output arranged on the counter shaft. The counter shaft, the counter input gear, and the counter output gear are arranged to rotate integrally. The counter output gear meshes with a differential ring gear, which is a differential input of the differential mechanism, thereby driving the differential ring gear. Then, the torque (power) generated at the output gear 7 is transmitted to the front wheels of the vehicle via the counter mechanism and the differential mechanism.

Now, it will be described how to change gears of the automatic transmission 1.

Figure 2:
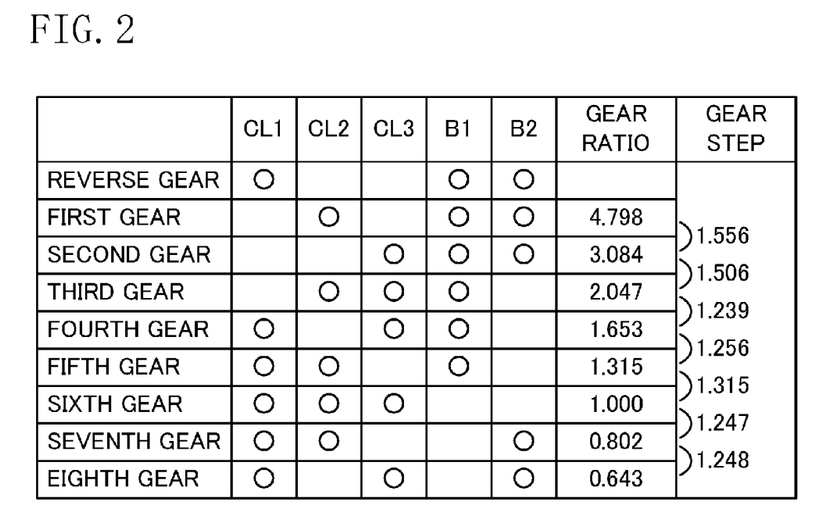
FIG. 2 is a table showing engagement states of first, second, and third clutches and first and second brakes in respective gears of the automatic transmission as well as gear ratios in respective gear stages and gear steps between the gear stages.

FIG. 2 shows engagement states of the first clutch CL1, the second clutch CL2, the third clutch CL3, the first brake B1, and the second brake B2 in respective gears. The open circles indicate engagement, and the blanks indicate disengagement.

FIG. 2 also shows gear ratios (i.e., gear reduction ratios) in the respective gear stages, and gear steps between the gear stages, where the number of teeth of the gears constituting the first to fourth planetary gear sets PL1-PL4 are set to be as follows. The gear steps are obtained by dividing the gear ratio in a first gear by the gear ratio in a second gear, the gear ratio in the second gear by the gear ratio in a third gear, the gear ratio in the third gear by the gear ratio in a fourth gear, the gear ratio in the fourth gear by the gear ratio in a fifth gear, the gear ratio in the fifth gear by the gear ratio in a sixth gear, the gear ratio in the sixth gear by the gear ratio in a seventh gear, and the gear ratio in the seventh gear by the gear ratio in an eighth gear, respectively. In FIG. 2, the transmission ratio range, which is obtained by dividing the gear ratio in the first gear by the gear ratio in the eighth gear, is 7.464.

The numbers of teeth of the constituting gears are as follows:

the first sun gear S1: 44, the first ring gear R1: 108, the single pinion P1: 32;

the second sun gear S2: 42, the second ring gear R2: 108, the single pinion P2: 33;

the third sun gear S3: 48, the third ring gear R3: 108, the double pinion P3: 30; and the fourth sun gear S4: 60, the fourth ring gear R4: 108, the single pinion P4: 24.

Note that these numbers of the teeth are only non-limiting examples.

The first clutch CL1 and the first and second brakes B1 and B2 are engaged to provide the reverse gear. At this time, the fourth carrier C4 engaged with the input shaft 3 rotates at a number of revolutions N0 in the same direction as the input shaft 3 rotates, where the number of revolutions of the input shaft 3 is N0. In the following description, unless otherwise stated, the gears are supposed to rotate in the same direction as the input shaft 3 rotates. If the gears rotate in the opposite direction from the input shaft 3, a statement will be made to that effect.

Engagement of the second brake B2 fixes the second sun gear S2 and the fourth sun gear S4 engaged with the second sun gear S2, and does not allow them to rotate. Since the fourth sun gear S4 is fixed and the fourth carrier C4 rotates at a number of revolutions N0, the fourth ring gear R4 and the third sun gear S3 engaged with the fourth ring gear R4 rotate at a number of revolutions N10 higher than N0. As a result, the third carrier C3 rotates at a number of revolutions N11 in the opposite direction from the input shaft 3.

Engagement of the first brake B1 fixes the first ring gear R1, and does not allow it to rotate. The first sun gear S1 engaged with the third carrier C3 rotates at the number of revolutions N11 in the opposite direction from the input shaft 3. As a result, the first carrier C1 and the second ring gear R2 engaged with the first carrier C1 rotate at a number of revolutions N12 lower than N11 in the opposite direction from the input shaft 3.

The second sun gear S2 is fixed, and the second ring gear R2 rotates at a number of revolutions N13 in the opposite direction from the input shaft 3. As a result, the second carrier C2 (i.e., the output gear 7) and the third ring gear R3 engaged with the second carrier C2 rotate in the opposite direction from the input shaft 3 at a number of revolutions lower than N13.

The second clutch CL2 and the first and second brakes B1 and B2 are engaged to provide the first gear. At this time, the fourth carrier C4 rotates at the number of revolutions N0, and the first sun gear S1 and the third carrier C3 rotate at the number of revolutions N0 via the second clutch CL2.

Engagement of the first brake B1 fixes the first ring gear R1, and does not allow it to rotate. Since the first ring gear R1 is fixed and the first sun gear S1 rotates at the number of revolutions N0, the first carrier C1 and the second ring gear R2 engaged with the first carrier C1 rotate at the number of revolutions N13 lower than N0.

Engagement of the second brake B2 fixes the second sun gear S2 and the fourth sun gear S4 engaged with the second sun gear S2, and does not allow them to rotate. Since the second sun gear S2 is fixed and the second ring gear R2 rotates at the number of revolutions N13, the second carrier C2 (i.e., the output gear 7) rotates at a number of revolutions N1 lower than N13.

Since the fourth sun gear S4 is fixed and the fourth carrier C4 rotates at the number of revolutions N0, the fourth ring gear R4 and the third sun gear S3 engaged with the fourth ring gear R4 rotate at a number of revolutions N14 higher than N0. Since the third carrier C3 rotates at the number of revolutions N0, the third ring gear R3 rotates at an intermediate number of revolutions between N0 and N14.

The third sun gear S3, the third carrier C3, the third ring gear R3, the fourth carrier C4, and the fourth ring gear R4 merely idle. The power from the power source 4 is input to the first sun gear S1 of the first planetary gear set PL1, and then is input from the first carrier C1 to the second ring gear R2 of the second planetary gear set PL2. Then, the power is output from the second carrier C2 to an output gear 7. That is to say, the power from the power source 4 is transmitted to the output gear 7 via the input shaft 3, and the first and second planetary gear sets PL1 and PL2.

The third clutch CL3 and the first and second brakes B1 and B2 are engaged to provide the second gear. At this time, the fourth carrier C4 rotates at the number of revolutions N0.

Engagement of the second brake B2 fixes the second sun gear S2 and the fourth sun gear S4 engaged with the second sun gear S2, and does not allow them to rotate. Since the fourth sun gear S4 is fixed and the fourth carrier C4 rotates at the number of revolutions N0, the fourth ring gear R4 and the third sun gear S3 engaged with the fourth ring gear R4 rotate at a number of revolutions N10 higher than N0.

Engagement of the third clutch CL3 allows the third sun gear S3, the third ring gear R3, and the third carrier C3 to rotate at the same number of revolutions N10. Accordingly, the first sun gear S1 engaged with the third carrier C3 rotates at the number of revolutions N10.

Engagement of the first brake B1 fixes the first ring gear R1, and does not allow it to rotate. Since the first ring gear R1 is fixed and the first sun gear S1 rotates at the number of revolutions N10, the first carrier C1, and the second ring gear R2 engaged with the first carrier C1 rotate at a number of revolutions N14, which satisfies N14>N13 and which is lower than N10.

Since the second sun gear S2 is fixed and the second ring gear R2 rotates at the number of revolutions N14, the second carrier C2 (i.e., the output gear 7) rotates at a number of revolutions N2, which satisfies N2>N1 and which is lower than N14.

The second and third clutches CL2 and CL3 and the first brake B1 are engaged to provide the third gear. At this time, the fourth carrier C4 rotates at the number of revolutions N0, and the first sun gear S1 and the third carrier C3 rotate at the number of revolutions N0 via the second clutch CL2.

Engagement of the third clutch CL3 allows the third sun gear S3, the third ring gear R3, and the third carrier C3 to rotate at the same number of revolutions N0. The fourth ring gear R4 engaged with the third sun gear S3 also rotates at the number of revolutions N0. Since the fourth ring gear R4 and the fourth carrier C4 rotate at the number of revolutions N0, the fourth sun gear S4 and the second sun gear S2 engaged with the fourth sun gear S4 also rotate at the number of revolutions N0.

Engagement of the first brake B1 fixes the first ring gear R1, and does not allow it to rotate. Since the first ring gear R1 is fixed and the first sun gear S1 rotates at a number of revolutions N0, the first carrier C1 and the second ring gear R2 engaged with the first carrier C1 rotate at a number of revolutions N15 lower than N0.

Since the second ring gear R2 rotates at the number of revolutions N15 and the fourth ring gear R4 rotates at the number of revolutions N0, the second carrier C2 (i.e., the output gear 7) rotates at an intermediate number of revolutions N3, which satisfies N3>N2 and which is between N14 and N0.

The first and third clutches CL1 and CL3 and the first brake B1 are engaged to provide the fourth gear. At this time, the fourth carrier C4 rotates at the number of revolutions N0.

The fourth ring gear R4 and the third sun gear S3 engaged with the fourth ring gear R4 rotate at a number of revolutions N16 lower than N0. The fourth sun gear S4 and the second sun gear S2 engaged with the fourth sun gear S4 rotate at a number of revolutions N17 higher than N0.

Engagement of the third clutch CL3 allows the third sun gear S3, the third ring gear R3, the third carrier C3, and the first sun gear S1 engaged with the third carrier C3 to rotate at the number of revolutions N16.

Engagement of the first brake B1 fixes the first ring gear R1, and does not allow it to rotate. The first ring gear R1 is fixed and the first sun gear S1 rotates at the number of revolutions N16. Thus, the first carrier C1, and the second ring gear R2 engaged with the first carrier C1 rotate at a number of revolutions N18 lower than N16.

Engagement of the first clutch CL1 allows the second carrier C2 (i.e., the output gear 7) to rotate at a number of revolutions N4, which is higher than N3, as high as the number of revolutions N16 of the third ring gear R3 and intermediate between N18 and N17.

The first and second clutches CL1 and CL2 and the first brake B1 are engaged to provide the fifth gear. At this time, the fourth carrier C4 rotates at the number of revolutions N0, and the first sun gear S1 and the third carrier C3 rotate at the number of revolutions N0 via the second clutch CL2.

Engagement of the first brake B1 fixes the first ring gear R1, and does not allow it to rotate. Since the first ring gear R1 is fixed and the first sun gear S1 rotates at the number of revolutions N0, the first carrier C1 and the second ring gear R2 engaged with the first carrier C1 rotate at the number of revolutions N15.

The third sun gear S3 and the fourth ring gear R4 engaged with the third sun gear S3 rotate at a number of revolutions N19 lower than N0. The third ring gear R3 rotates at an intermediate number of revolutions N20 between N19 and N0.

Since the fourth carrier C4 rotates at the number of revolutions N0, and the fourth ring gear R4 rotates at the number of revolutions N19, the fourth sun gear S4 and the second sun gear S2 engaged with the fourth sun gear S4 rotate at a number of revolutions N21 higher than N0.

Engagement of the first clutch CL1 allows the second carrier C2 (i.e., the output gear 7) to rotate at a number of revolutions N5 which is higher than N4, as high as the number of revolutions N20 of the third ring gear R3, and intermediate between N19 and N21.

The first, second, and third clutches CL1, CL2 and CL3 are engaged to provide the sixth gear. At this time, the fourth carrier C4 rotates at the number of revolutions N0, and the first sun gear S1 and the third carrier C3 rotate at the number of revolutions N0 via the second clutch CL2.

Engagement of the third clutch CL3 allows the third sun gear S3, the third ring gear R3, and the third carrier C3 to rotate at the same number of revolutions N0. The fourth ring gear R4 engaged with the third sun gear S3 rotates at the number of revolutions N0. Since the fourth ring gear R4 and the fourth carrier C4 rotate at the number of revolutions N0, the fourth sun gear S4 and the second sun gear S2 engaged with the fourth sun gear S4 also rotate at the number of revolutions N0.

Engagement of the first clutch CL1 allows the second carrier C2 (i.e., the output gear 7) to rotate at a number of revolutions N6, which satisfies N6>N5 and which is as high as the number of revolutions N0.

The second ring gear R2 also rotates at the number of revolutions N0 (=N6), and the first sun gear S1, the first ring gear R1, and the first carrier C1 also rotate at the number of revolutions N0 (=N6).

The first and second clutches CL1 and CL2 and the second brake B2 are engaged to provide the seventh gear. At this time, the fourth carrier C4 rotates at the number of revolutions N0, and the first sun gear S1 and the third carrier C3 rotate at the number of revolutions N0 via the second clutch CL2.

Engagement of the second brake B2 fixes the second sun gear S2 and the fourth sun gear S4 engaged with the second sun gear S2, and does not allow them to rotate. Since the fourth sun gear S4 is fixed and the fourth carrier C4 rotates at the number of revolutions N0, the fourth ring gear R4 and the third sun gear S3 engaged with the fourth ring gear R4 rotate at the number of revolutions N10 higher than N0.

The third sun gear S3 rotates at the number of revolutions N10, and the third carrier C3 rotates at the number of revolutions N0. Thus, the third ring gear R3 rotates at an intermediate number of revolutions N22 between N0 and N10.

Engagement of the first clutch CL1 allows the second carrier C2 (i.e., the output gear 7) to rotate at a number of revolutions N7, which satisfies N7>N6 and which is as high as the number of revolutions N22 of the third ring gear R3.

The second ring gear R2 and the first carrier C1 engaged with the second ring gear R2 rotate at a number of revolutions N23 higher than N22 (=N7). The first ring gear R1 rotates at a number of revolutions higher than N23.

The first and third clutches CL1 and CL3 and the second brake B2 are engaged to provide the eighth gear. At this time, the fourth carrier C4 rotates at the number of revolutions N0.

Engagement of the second brake B2 fixes the second sun gear S2 and the fourth sun gear S4 engaged with the second sun gear S2, and does not allow them to rotate. Since the fourth sun gear S4 is fixed and the fourth carrier C4 rotates at the number of revolutions N0, the fourth ring gear R4 and the third sun gear S3 engaged with the fourth ring gear R4 rotate at the number of revolutions N10 higher than N0.

Engagement of the third clutch CL3 allows the third sun gear S3, the third ring gear R3, and the third carrier C3 to rotate at the same number of revolutions N10, and the fourth ring gear R4 to rotate at the number of revolutions N10. This allows the second carrier C2 (i.e., the output gear 7) to rotate at a number of revolutions N8, which satisfies N8>N7 and which is as high as the number of revolutions N10.

The second ring gear R2 and the first carrier C1 engaged with the second ring gear R2 rotate at a number of revolutions N24 higher than N10 (=N8). The first ring gear R1 rotates at a number of revolutions higher than N24.

In this embodiment, in the first gear, engagement of the second clutch CL2, and the first and second brakes B1 and B2 allows the power from the power source 4 to be transmitted to the output gear 7 via the input shaft 3 and the first and second planetary gear sets PL1 and PL2. As a result, the first and second planetary gear sets PL1 and PL2 decelerate the automatic transmission 1 with respect to the input. Thus, this may reduce the load applied to the respective gears (in particular, pinions P1 and P2) constituting the first and second planetary gear sets PL1 and PL2 more significantly than a case where one planetary gear set decelerates the automatic transmission 1 with respect to the input. As a result, the respective gears constituting the first and second planetary gear sets PL1 and PL2 may be reduced in size. The third and fourth planetary gear sets PL3 and PL4 do not transmit the power in the first gear. Thus, the respective gears constituting the third and fourth planetary gear sets PL3 and PL4 may be reduced in size, too.

The first sun gear S1 of the first planetary gear set PL1 is disposed at a radially inner position in the first planetary gear set PL1 (closer to the input shaft 3). This allows the input shaft 3 and the first sun gear S1 to be engaged with each other (via the second clutch CL2 in this embodiment) easily. The first and second brakes B1 and B2 are usually disposed near the transmission case 2. The first ring gear R1 of the first planetary gear set PL1 is disposed at a radially outer position in the first planetary gear set PL1 (closer to the transmission case 2). Thus, this allows the first ring gear R1 and the first brake B1 to be engaged with each other easily. Although the second sun gear S2 of the second planetary gear set PL2 is not disposed closer to the second brake B2 (closer to the transmission case 2) in the radial direction of the second planetary gear set PL2, the second sun gear S2 may be engaged easily with the second brake B2 since the second planetary gear set PL2 is an endmost one of the four planetary gear sets PL1, PL2, PL3, and PL4. Furthermore, an engaging member engaging the first carrier C1 to the second ring gear R2 is disposed to pass through a space between the first and second brakes B1 and B2 in the input shaft direction near the transmission case 2. This allows the first carrier C1 to be engaged with the second ring gear R2 easily. Consequently, this may reduce the overall size of the automatic transmission 1 with a greater number of gears without increasing the degree of complexity of engagement among the first and second planetary gear sets PL1 and PL2 and the first and second brakes B1 and B2.

Furthermore, in this embodiment, appropriate engagement of the four planetary gear sets PL1, PL2, PL3, and PL4, and the five frictional engagement elements CL1, CL2, CL3, B1, and B2 may provide eight forward gears and one reverse gear easily. On top of that, appropriately setting the numbers of teeth of the gears constituting the planetary gear sets may provide appropriate gear reduction ratios for respective gear stages, as shown in FIG. 2. In other words, the gear steps between the gear stages may be set so as to allow the driver to drive the vehicle more comfortably with good feeling.

Figure 3:
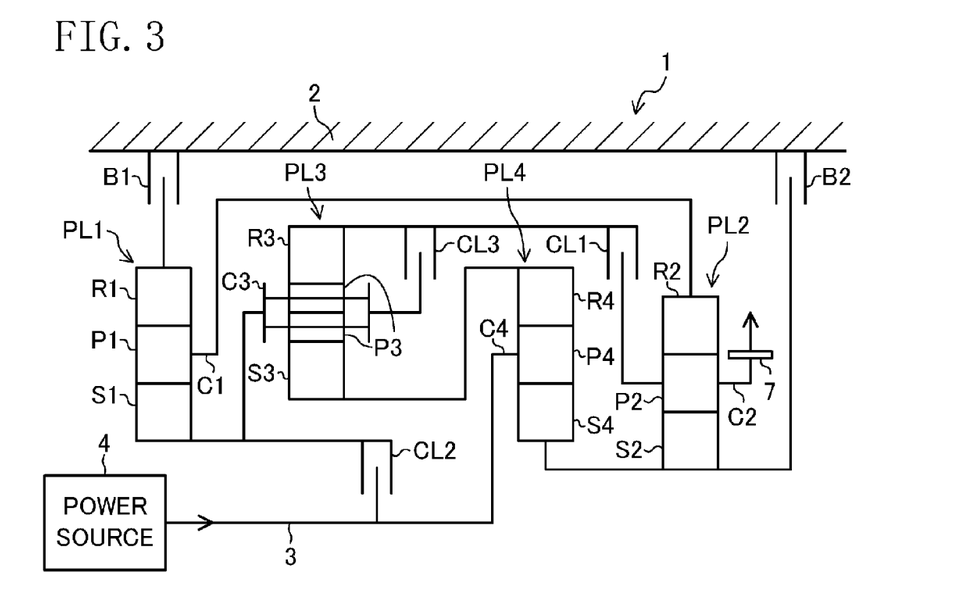
FIG. 3 illustrates a variation of the first embodiment and corresponds to FIG. 1.

FIG. 3 illustrates a variation of the first embodiment. Instead of engaging and disengaging the third sun gear S3 with and from the third ring gear R3, the third clutch CL3 according to this variation is configured to engage and disengage the third carrier C3 with and from the third ring gear R3. The other configurations and arrangements, and the engagement states of the first, second, and third clutches CL1, CL2, and CL3, and the first and second brakes B1 and B2 in the respective gears are the same as in the first embodiment. The same reference characters as those shown in FIG. 1 are used to denote equivalent elements.

Figure 4:
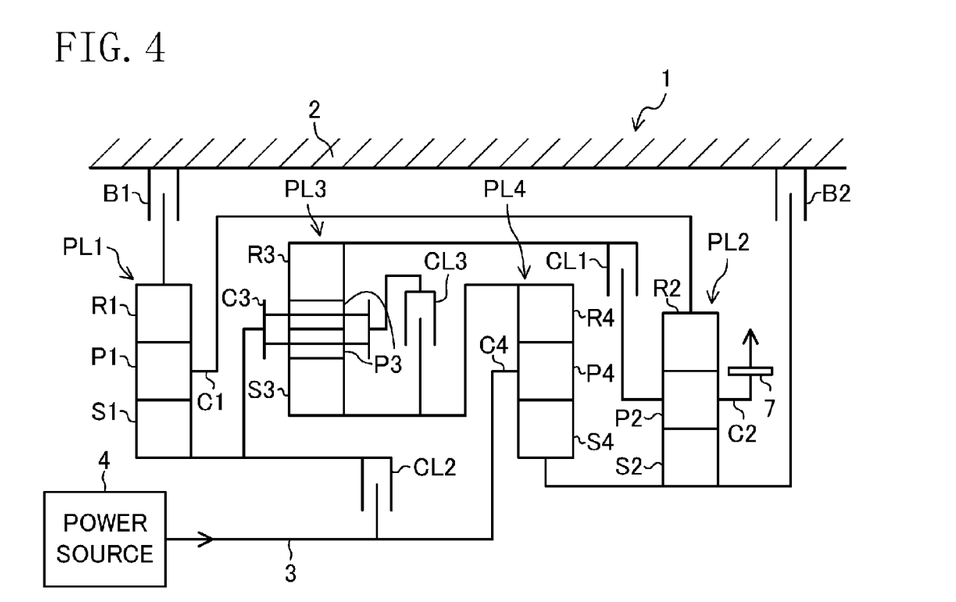
FIG. 4 illustrates another variation of the first embodiment and corresponds to FIG. 1.

FIG. 4 illustrates another variation of the first embodiment. Instead of engaging and disengaging the third sun gear S3 with and from the third ring gear R3, the third clutch CL3 according to this variation is configured to engage and disengage the third sun gear S3 with and from the third carrier C3. The other configurations and arrangements, and the engagement states are the same as in the first embodiment. The same reference characters as those shown in FIG. 1 are used to denote equivalent elements.

The third clutch CL3 is provided in order to allow, with its engagement, the third sun gear S3, the third carrier C3, and the third ring gear R3 to rotate integrally (at the same number of revolutions). For this purpose, the third clutch CL3 at least needs to engage and disengage two of the third sun gear S3, third carrier C3, and third ring gear R3 of the third planetary gear set PL3 with and from each other. As a result, the two variations described above also achieve the same or similar effects and advantages as/to in the first embodiment.

Second Embodiment

Figure 5:
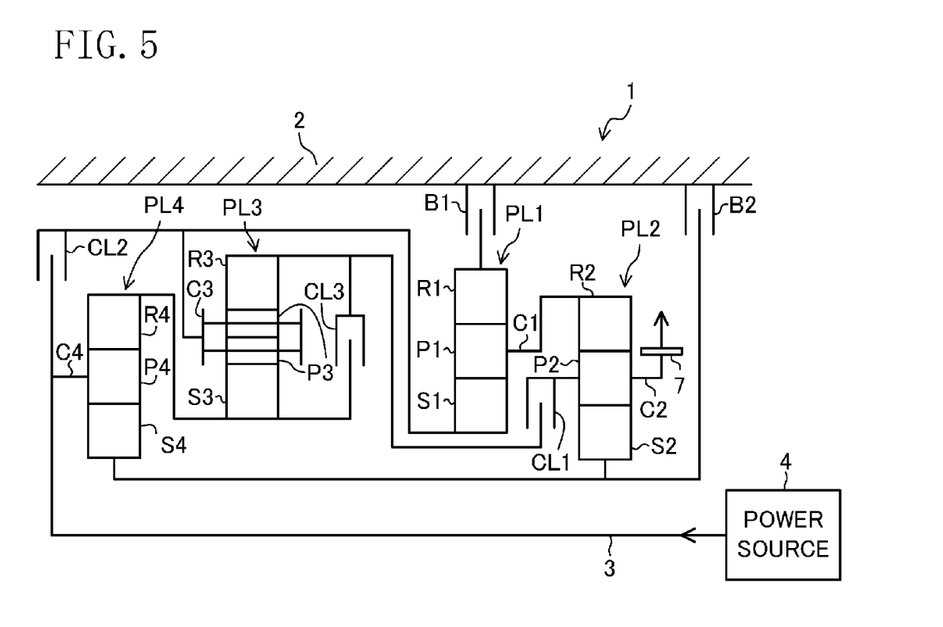
FIG. 5 illustrates a second embodiment of the present invention and corresponds to FIG. 1.

FIG. 5 illustrates a second embodiment of the present invention. In this embodiment, the arrangement of the first to fourth planetary gear sets PL1-PL4 along the input shaft 3 is different from that of the first embodiment. The engagement states of the four planetary gear sets PL1, PL2, PL3, and PL4, and the engagement states of the first, second, and third clutches CL1, CL2, and CL3, and the first and second brakes B1 and B2 in the respective gears are the same as in the first embodiment. The same reference characters as those shown in FIG. 1 are used to denote equivalent elements.

Specifically, in this embodiment, the fourth, third, first, and second planetary gear sets PL4, PL3, PL1, and PL2 are arranged in this order along the input shaft 3 from one end (i.e., the left end of FIG. 5) of the input shaft 3 toward the other. That is to say, the first and second planetary gear sets PL1 and PL2 are disposed adjacent to each other along the input shaft 3.

In this embodiment, the power source 4 is coupled to the other axial end of the input shaft 3 (the right end in FIG. 5). Alternatively, as in the first embodiment, the power source 4 may also be coupled to the one axial end of the input shaft 3.

Such arrangement of the planetary gear sets PL1, PL2, PL3, and PL4 may reduce the length of the engaging member engaging the first carrier C1 to the second ring gear R2 more significantly in this embodiment than in the first embodiment. Even if a heavy load is applied to this engaging member in the first gear, the engaging member is hardly bent or twisted. Consequently, the power may be transmitted efficiently from the first carrier C1 to the second ring gear R2.

In the second embodiment, instead of engaging and disengaging the third sun gear S3 with and from the third ring gear R3, the third clutch CL3 may also be configured as in the variations of the first embodiment to engage and disengage the third carrier C3 with and from the third ring gear R3 or the third sun gear S3 with and from the third carrier C3.

The present invention is not limited to the above embodiments, but may be modified without departing from the scope of the appended claims.

For example, in the first and second embodiments, the second clutch CL2 engaging and disengaging the input shaft 3 with and from the first sun gear S1 is provided, and is engaged in the first gear (the first and second brakes B1 and B2 are also engaged at the same time). However, the present invention is not limited thereto. Alternatively, the input shaft 3 and the first sun gear S1 may always be engaged with each other without any clutches, and the first and second brakes B1 and B2 may be engaged in the first gear to allow the power from the power source 4 to be transmitted to the output gear 7 via the input shaft 3 and the first and second planetary gear sets PL1 and PL2.

In the first and second embodiments, the torque (i.e., the power) is transmitted from the second planetary gear set PL2 to the counter mechanism via the meshing between the output gear 7 and the counter input gear. However, the torque may also be transmitted via chains or belts. In that case, the output driven by the second carrier C2 of the second planetary gear set PL2 and the counter input of the counter mechanism are configured as chain sprockets wound with the chains or pulleys wound with the belts. Likewise, the torque (i.e., the power) may also be transmitted from the counter mechanism to the differential mechanism via chains or belts. In that case, the counter output of the counter mechanism and the differential input of the differential mechanism are also configured as chain sprockets wound with chains or pulleys wound with belts.

Furthermore, the present invention is applicable not only to an automatic transmission mounted in an FF vehicle but also to an automatic transmission mounted in an FR vehicle. The automatic transmission mounted in the FR vehicle may be obtained by partially modifying the automatic transmission 1 in FIG. 1, 3, or 4. That is to say, in that case, the second sun gear S2 may be configured as two split sun gears obtained by splitting a sun gear into two portions in the input shaft direction (extending in the longitudinal direction in the FR vehicle) with a space left between the two split sun gears. Of these two split sun gears, one split sun gear closer to the four sun gear S4 (closer to the front end of the vehicle) may be engaged with the fourth sun gear S4, and the other split sun gear closer to the second brake B2 (closer to the rear end of the vehicle) may be engaged with the second brake B2. Instead of the output gear 7, an output shaft which extends in the longitudinal direction of the vehicle and the rear end of which is engaged with a propeller shaft may function as an output engaged with the second carrier C2 and may be arranged coaxially with the input shaft 3. The front end of the output shaft may be engaged with the second carrier C2 via an engaging member passing through the space between the two split sun gears and a region where the single pinion P2 between the second sun gear S2 and the second ring gear R2 is not provided.

The embodiments described above are mere examples and are not intended to be construed as limiting the scope of the present invention. The scope of the present invention is defined by the claims. All variations and modifications of the claims and equivalents thereof fall within the scope of the present invention.

INDUSTRIAL APPLICABILITY

The present invention is useful as an automatic transmission including a plurality of planetary gear sets.

DESCRIPTION OF REFERENCE CHARACTERS

1 Automatic Transmission
3 Input Shaft
4 Power Source
7 Output Gear (Output)
PL1 First Planetary Gear Set
PL2 Second Planetary Gear Set
PL3 Third Planetary Gear Set
PL4 Fourth Planetary Gear Set
S1 First Sun Gear
S2 Second Sun Gear
S3 Third Sun Gear
S4 Fourth Sun Gear
C1 First Carrier
C2 Second Carrier
C3 Third Carrier
C4 Fourth Carrier
R1 First Ring Gear
R2 Second Ring Gear
R3 Third Ring Gear
R4 Fourth Ring Gear
CL1 First Clutch (Frictional Engagement Element)
CL2 Second Clutch (Frictional Engagement Element)
CL3 Third Clutch (Frictional Engagement Element)
B1 First Brake (Frictional Engagement Element)
B2 Second Brake (Frictional Engagement Element)

The invention claimed is:

1. An automatic transmission comprising:
an input shaft to which power generated by a power source is input;
first and second planetary gear sets of a single pinion type;
frictional engagement elements including first and second brakes; and
an output, wherein
the first planetary gear set has:
    a first sun gear to which the power from the power source is input via the input shaft;
    a first ring gear engaged with the first brake; and
    a first carrier,
the second planetary gear set has:
    a second ring gear always engaged with the first carrier;
    a second sun gear engaged with the second brake; and
    a second carrier engaged with the output,
the automatic transmission is configured to engage the first and second brakes in a first gear to allow the power from the power source to be transmitted to the output via the input shaft and the first and second planetary gear sets,
the automatic transmission further comprises:
    a third planetary gear set of a double pinion type having a third sun gear, a third carrier, and a third ring gear; and
    a fourth planetary gear set of the single pinion type having a fourth sun gear, a fourth carrier, and a fourth ring gear,
the input shaft and the fourth carrier are always engaged with each other,
the first sun gear and the third carrier are always engaged with each other,
the third sun gear and the fourth ring gear are always engaged with each other,
the second sun gear and the fourth sun gear are always engaged with each other, and
the frictional engagement elements further include:
    a first clutch engaging and disengaging the second carrier with and from the third ring gear;
    a second clutch engaging and disengaging the input shaft with and from the first sun gear and the third carrier; and
    a third clutch engaging and disengaging the third sun gear with and from the third ring gear, or the third carrier with and from the third ring gear, or the third sun gear with and from the third carrier.

2. An automatic transmission comprising:
an input shaft to which power generated by a power source is input;
first and second planetary gear sets of a single pinion type;
frictional engagement elements including first and second brakes;
an output; wherein
the first planetary gear set has:
    a first sun gear to which the power from the power source is input via the input shaft;
    a first ring gear engaged with the first brake; and
    a first carrier,
the second planetary gear set has:
    a second ring gear always engaged with the first carrier;
    a second sun gear engaged with the second brake; and
    a second carrier engaged with the output,
the automatic transmission further comprises:
    a third planetary gear set of a double pinion type having a third sun gear, a third carrier, and a third ring gear; and
    a fourth planetary gear set of the single pinion type having a fourth sun gear, a fourth carrier, and a fourth ring gear,
the input shaft and the fourth carrier are always engaged with each other,
the first sun gear and the third carrier are always engaged with each other,
the third sun gear and the fourth ring gear are always engaged with each other,
the second sun gear and the fourth sun gear are always engaged with each other, and
the frictional engagement elements further include:
    a first clutch engaging and disengaging the second carrier with and from the third ring gear;

a second clutch engaging and disengaging the input shaft with and from the first sun gear and the third carrier; and a third clutch engaging and disengaging the third sun gear with and from the third ring gear, or the third carrier with and from the third ring gear, or the third sun gear with and from the third carrier.

3. The automatic transmission of claim 1, wherein
the automatic transmission provides eight forward gears and one reverse gear,
the first clutch and the first and second brakes are engaged to provide the reverse gear,
the second clutch and the first and second brakes are engaged to provide the first gear,
the third clutch and the first and second brakes are engaged to provide a second gear,
the second and third clutches and the first brake are engaged to provide a third gear,
the first and third clutches and the first brake are engaged to provide a fourth gear,
the first and second clutches and the first brake are engaged to provide a fifth gear,
the first, second, and third clutches are engaged to provide a sixth gear,
the first and second clutches and the second brake are engaged to provide a seventh gear, and
the first and third clutches and the second brake are engaged to provide an eighth gear.

4. The automatic transmission of claim 2, wherein
the automatic transmission provides eight forward gears and one reverse gear,
the first clutch and the first and second brakes are engaged to provide the reverse gear,
the second clutch and the first and second brakes are engaged to provide the first gear,
the third clutch and the first and second brakes are engaged to provide a second gear,
the second and third clutches and the first brake are engaged to provide a third gear,
the first and third clutches and the first brake are engaged to provide a fourth gear,
the first and second clutches and the first brake are engaged to provide a fifth gear,
the first, second, and third clutches are engaged to provide a sixth gear,
the first and second clutches and the second brake are engaged to provide a seventh gear, and
the first and third clutches and the second brake are engaged to provide an eighth gear.

\* \* \* \* \*